United States Patent
Sasaki

(10) Patent No.: US 8,739,181 B2
(45) Date of Patent: May 27, 2014

(54) PROCESSING APPARATUS AND METHOD

(75) Inventor: Osamu Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1225 days.

(21) Appl. No.: 12/394,460

(22) Filed: Feb. 27, 2009

(65) Prior Publication Data

US 2009/0235279 A1  Sep. 17, 2009

(30) Foreign Application Priority Data

Mar. 14, 2008 (JP) .................................. 2008-066738

(51) Int. Cl.
G06F 9/46 (2006.01)
G06F 9/54 (2006.01)
G06F 17/30 (2006.01)

(52) U.S. Cl.
CPC . *G06F 9/54* (2013.01); *G06F 9/546* (2013.01); *G06F 17/30914* (2013.01)
USPC .......................................... 719/315; 719/313

(58) Field of Classification Search
None
See application file for complete search history.

(56) References Cited

U.S. PATENT DOCUMENTS

| | | | | |
|---|---|---|---|---|
| 6,985,910 | B2 * | 1/2006 | Hollingsworth | 707/801 |
| 8,135,868 | B2 * | 3/2012 | Shelby et al. | 709/249 |
| 2004/0111533 | A1 * | 6/2004 | Beisiegel et al. | 709/246 |
| 2006/0123047 | A1 | 6/2006 | Christensen et al. | 707/103 |
| 2007/0005624 | A1 * | 1/2007 | Wu et al. | 707/101 |
| 2007/0198482 | A1 * | 8/2007 | Allen et al. | 707/3 |

* cited by examiner

*Primary Examiner* — Hyung Sub (Sam) Sough
*Assistant Examiner* — Umut Onat
(74) *Attorney, Agent, or Firm* — Fitzpatrick, Cella, Harper & Scinto

(57) ABSTRACT

A processing apparatus for processing elements, which are contained in a message received via a network, by an application is provided. The apparatus includes a selection unit configured to select, in accordance with the number of elements contained in the received message, whether conversion of an element to a form by the application is carried out in response to or prior to a request from the application, a storage unit configured to store an element, which is converted to a form by the application, in response to a request from the application, a read-out unit configured to read an element, which has been requested by the application, out of the storage unit, and a conversion unit configured to convert an element to a form by the application in response to and prior to a request from the application in accordance with the selection.

9 Claims, 8 Drawing Sheets

PROCESSING APPARATUS AND METHOD

CROSS REFERENCE TO RELATED APPLICATION

The present application claims the benefit of Japanese Patent Application No. 2008-066738, filed Mar. 14, 2008. The entire disclosure of the prior application is incorporated by reference in its entirety, as if set forth fully herein.

BACKGROUND OF THE INVENTION

1. Field of the Invention

The present invention relates to a processing apparatus and method in which an element contained in a message received via a network is processed by an application.

2. Description of the Related Art

A so-called "Web service" through which a plurality of apparatuses connected to a network communicates data with one another is presently in practical use. With the Web service, applications running on a plurality of apparatuses exchange objects utilized by the applications. An apparatus on the transmitting side converts an object, which is transmitted by the application on this side, to an XML element and transmits the XML element as part of a SOAP message, which is the standard protocol of the Web service. An apparatus on the receiving side converts the XML element, which has been extracted from the received SOAP message, to an object and the application on the receiving side utilizes this object. An application running on an apparatus on the service-utilizing side transmits an object, which will be the argument of a function in an application on the service-providing side, and receives an object of a return value of the function. Further, the application of the apparatus on the service-providing side executes its own function with the received object serving as an argument and transmits an object of this return value as a response. In data communication utilizing the Web service, a method of thus exchanging objects in the form of a function call is common.

In order to perform the above-mentioned function call, it is required that the XML element received as the SOAP message be converted to an object in a form capable of being utilized by an application. With regard to the conversion, the general practice is for all XML elements contained in the SOAP message to be converted to objects after they are written to a memory, as described in US laid-open patent US2006/0123047. An overview of this method will be described with reference to FIG. 1A. FIGS. 1A-1C are diagrams for comparing methods of processing a received SOAP message. A SOAP message 101 contains a plurality of XML elements 107. A communication apparatus 102 that has received the SOAP message 101 writes all of the XML elements 107 contained in the SOAP message 101 to a memory 105 and a converter 103 converts the elements to objects 108. In FIGS. 1A-1C, $E_1$ to $E_n$ represent XML elements and $O_1$ to $O_n$ represent objects in which respective ones of these XML elements have been converted. An application 104 executes processing using the objects 108.

It is possible for the format of a SOAP message to be defined beforehand by an interface definition document, etc. However, there are many cases where the number of XML elements is first defined when a function is implemented, and an apparatus on the side that receives the SOAP message cannot predict the size of the SOAP message in advance. In a case where a SOAP message having a large number of XML elements is converted to objects all at one time, memory is put under pressure particularly in an environment in which memory capacity is small, as in the case of a built-in apparatus. As a result, there is a possibility that XML elements contained in the SOAP message cannot be converted to objects or that even if elements can be converted, execution of an application cannot continue owing to inadequate memory. For example, with the format shown in FIG. 1A, all XML elements 107 contained in the SOAP message 101 are converted to objects 108 after they are written to memory 105. As a consequence, the memory 105 is put under pressure when the number of XML elements 107 is large.

It is possible for an application to process XML elements without converting them to objects. For example, there is format shown in FIG. 1B. Here an application that has received the SOAP message 101 extracts the XML elements 107 and converts them to the objects 108. Since it is possible for the application 104 to save an object 109, which is not used immediately, in a temporary storage area 106, there is no fear that the memory will be put under pressure unnecessarily. In this case, however, processing for handling SOAP messages directly and processing for converting XML elements to objects capable of being processed by the application must be implemented by respective applications. This results in a marked decline in the efficiency with which applications can be developed.

SUMMARY OF THE INVENTION

The present invention provides message processing which will not consume a large quantity of memory and will not cause a decline in application development efficiency.

According to one aspect of the present invention, a processing apparatus for processing elements, which are contained in a message received via a network, by an application, comprises a selection unit configured to select, in accordance with the number of elements contained in the received message, whether conversion of an element contained in the received message to a form processable by the application is carried out in response to a request from the application or prior to a request from the application, a storage unit configured to store an element, which is converted to a form processable by the application, in response to a request from the application, a read-out unit configured to read an element, which has been requested by the application, out of the storage unit, and a conversion unit configured to convert an element, which has been read out of the storage unit, to a form processable by the application in response to a request from the application, and to convert an element contained in the received message to a form processable by the application prior to a request from the application, in accordance with the selection made by the selection unit.

According to another aspect of the present invention, a processing apparatus for processing elements, which are contained in a message received via a network, by an application, comprises a selection unit configured to select, in accordance with whether elements contained in the received message are elements in an array, whether conversion of an element contained in the received message to a form processable by the application is carried out in response to a request from the application or prior to a request from the application, a storage unit configured to store an element, which is converted to a form processable by the application, in response to a request from the application, a read-out unit configured to read an element, which has been requested by the application, out of the storage unit, and a conversion unit configured to convert an element, which has been read out of the storage unit, to a form processable by the application in response to a request from the application, and to convert an element contained in the received message to a form processable by the application prior to a request from the application, in accordance with the selection made by the selection unit.

According to still another aspect of the present invention, a processing method of processing elements, which are contained in a message received via a network, by an application, comprises the steps of selecting, in accordance with the number of elements contained in the received message, whether conversion of an element contained in the received message to a form processable by the application is carried out in response to a request from the application or prior to a request from the application, storing an element, which is converted to a form processable by the application, in a memory in response to a request from the application, reading an element, which has been requested by the application, out of the memory, and in accordance with the selection made, converting an element, which has been read out of the memory, to a form processable by the application in response to a request from the application, and converting an element contained in the received message to a form processable by the application prior to a request from the application.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will now be described in detail with reference to the accompanying drawings. It should be noted that although a SOAP message is taken as an example below, the message is not limited to a SOAP message so long as it is a message used in message communication in which an element of a message is converted to an object in a form capable of being utilized by an application.

<First Embodiment>

This embodiment deals with a case where the present invention is applied to a communication apparatus that has received a SOAP message.

Figure 1A:
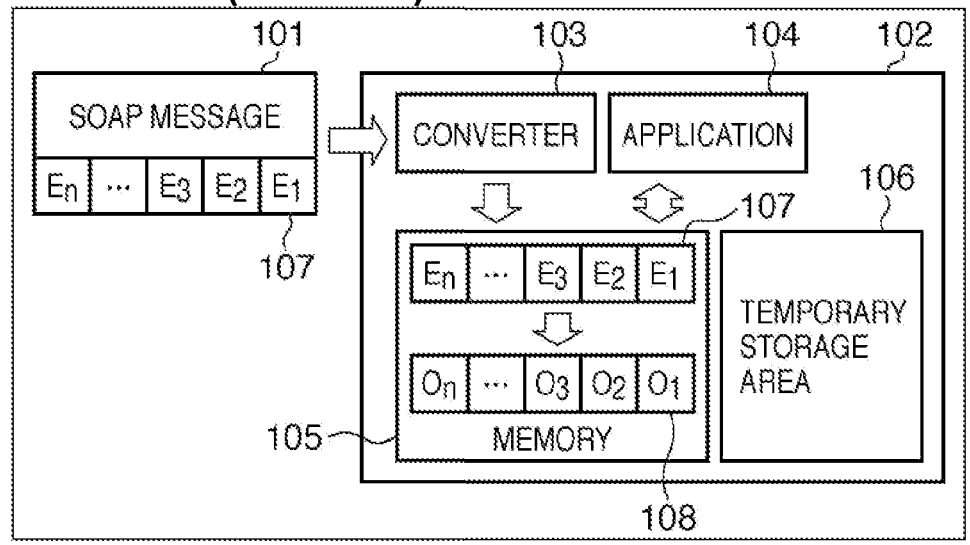
FIGS. 1A-1C are diagrams comparing methods of processing received SOAP messages.
Figure 1B:
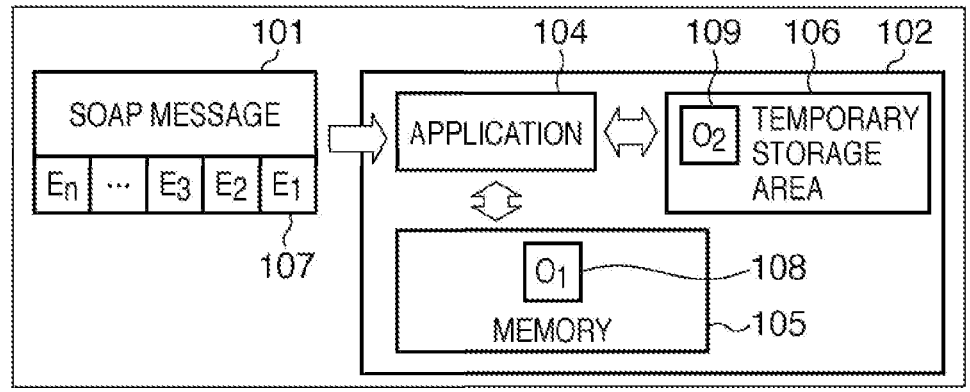
Figure 1C:
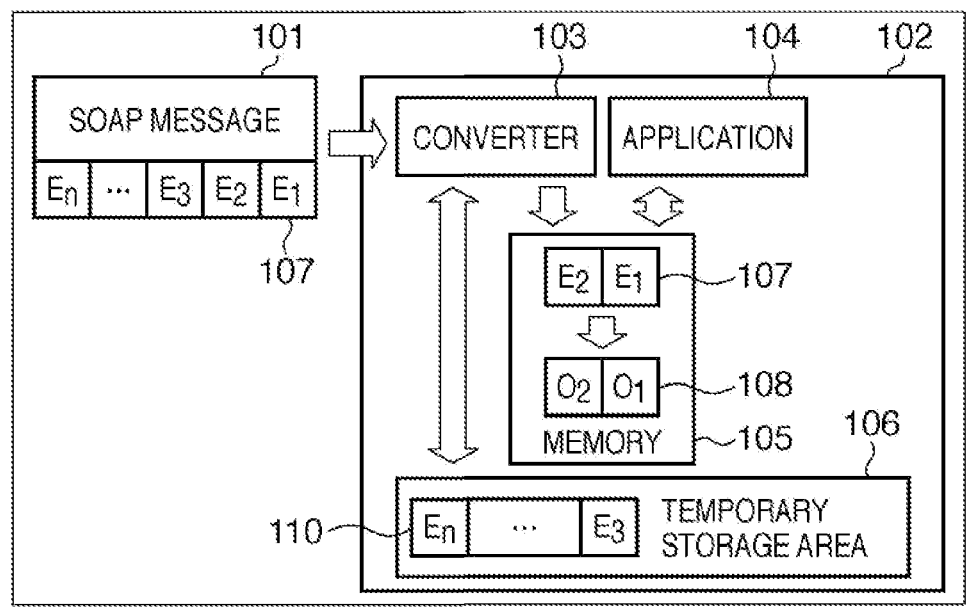

An overview of this embodiment will be described with reference to FIG. 1C.

The communication apparatus 102 that has received the SOAP message 101 writes the extracted XML elements 107 to the memory 105 and the converter 103 converts the elements to the objects 108. If the number of XML elements 107 written to the memory exceeds a previously set threshold value, XML elements 110 remaining in the SOAP message 101 are stored in the temporary storage area 106 as is. The application 104 then executes functions.

If the application 104 requires objects that have not been converted, then the converter 103 writes the XML elements 110, which have been stored in the temporary storage area 106, to the memory 105 and converts them to objects 108. As a result, the application 104 need not process XML elements directly and can execute functions by handling only the objects, which the application 104 can process. This is an overview of this embodiment.

Figure 2:
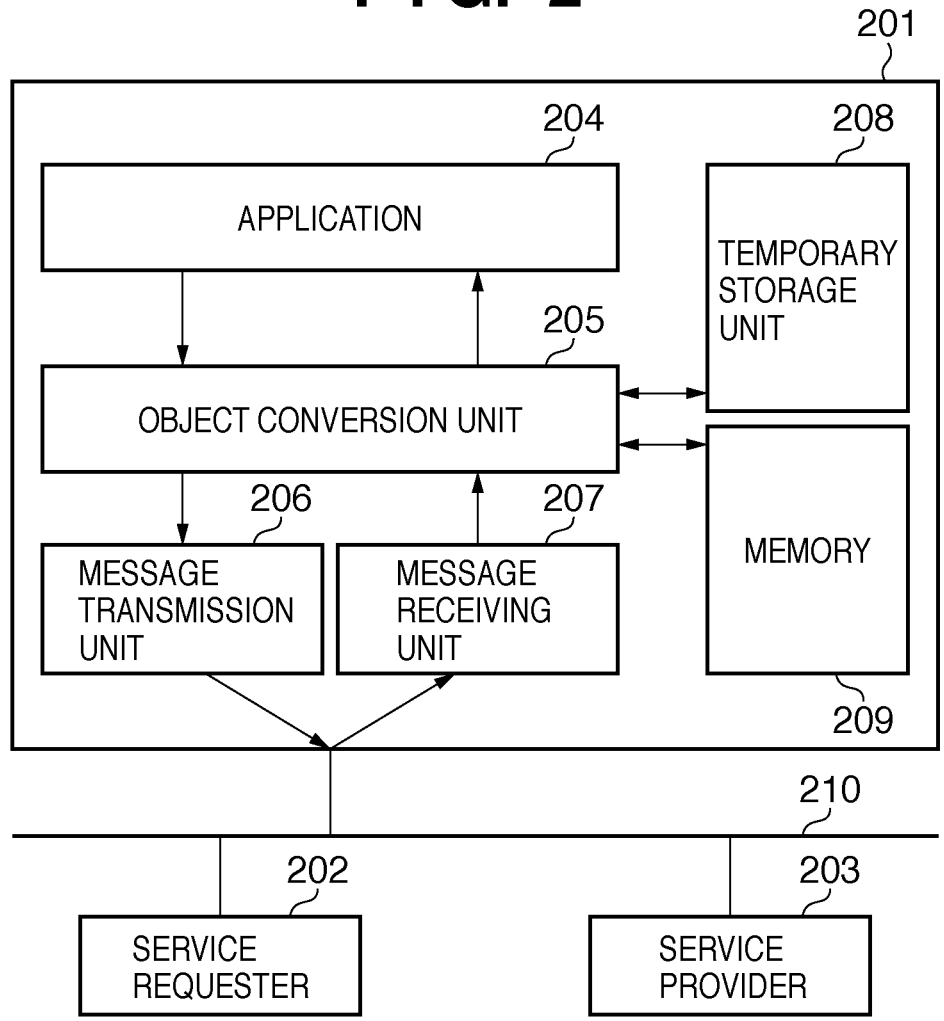
FIG. 2 illustrates an example of the configuration of a message communication system in an embodiment of the present invention.

Reference will be made to FIG. 2 to describe the configuration of a message communication system that includes an example of the structure of a communication apparatus 201 that sends and receives messages, a service requester 202 and a service provider 203. These are connected to a network. FIG. 2 illustrates an example of the configuration of a message communication system according to this embodiment.

The communication apparatus 201 is one that sends and receives messages.

The service requester 202 is a computer which is a client on the side that utilizes a service. The service requester 202 transmits a request message, which is a message for requesting a service, to the communication apparatus 201 or service provider 203 and receives a response message as an answer.

The service provider 203 is a computer which is a server on the side that provides a service. The service provider 203 receives the request message from the communication apparatus 201 or service requester 202 and transmits a response message as an answer.

It should be noted that the communication apparatus 201 is also capable of acting as both the service requester 202 and service provider 203. These apparatuses are connected to a network 210. The network 210 may be of any form so long as it is capable of communicating messages. Examples of such a network are the Internet, a WAN or a LAN.

The communication apparatus 201 includes an application 204, an object conversion unit 205, a message transmission unit 206, a message receiving unit 207, a temporary storage unit 208 and a memory 209. The application 201, object conversion unit 205, message transmission unit 206 and message receiving unit 207 are software modules implemented by having a controller 301, which is a computer described later, execute programs.

The application 204 exchanges objects with an application contained in another apparatus. The object conversion unit 205 performs a mutual conversion between XML elements contained in a message and objects. A message is in a form capable of being used in communication over the network 210 and an object is in a form capable of being processed by the application 204. The message transmission unit 206 sends to the network 210 a message accepted from the object conversion unit 205. The message receiving unit 207 delivers the message received from the network 210 to the object conversion unit 205.

The temporary storage unit 208 temporarily stores as is some of the XML elements contained in the message accepted from the object conversion unit 205 and writes these elements to the memory 209 in accordance with a request from the object conversion unit 205. The memory 209 is a work area used in conversions by the object conversion unit 205 and in execution of the functions of the application 204 and stores XML elements and objects.

More specifically, the message receiving unit 207 delivers the message received from the network 210 to the object conversion unit 205. The object conversion unit 205 converts an element in an array contained in the received message to an object and writes the object to the memory 209. In a case where the number of elements converted to objects exceeds a threshold value set beforehand, the object conversion unit 205 stores the remaining elements, which are contained in the message delivered from the message receiving unit 207, in the temporary storage unit 208 as is. The application 204 subsequently executes the functions. If the application 204 requires objects not yet converted, then the object conversion unit 205 writes the elements that have been stored in the temporary storage unit 208 to the memory 209 and converts them to objects.

As a result, the application 204 need not process XML elements directly and can execute functions by handling only the objects, which the application 204 can execute.

Figure 3:
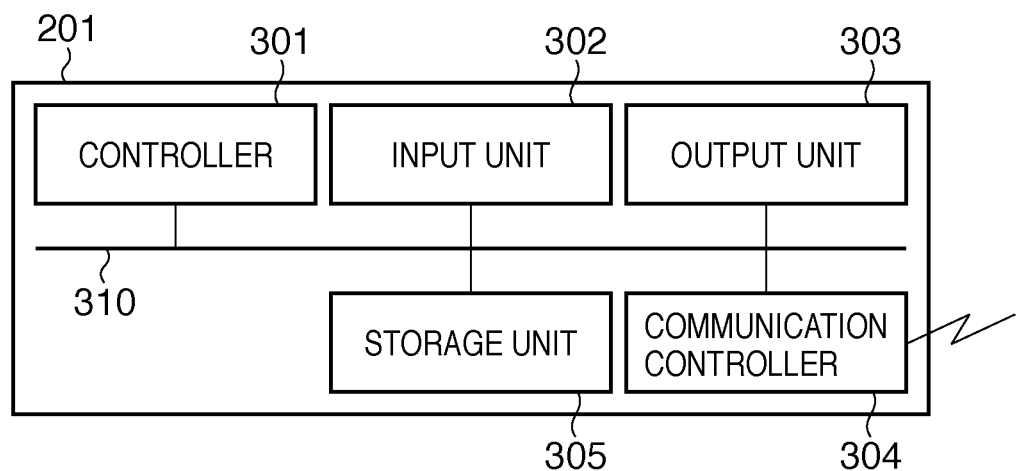
FIG. 3 is a block diagram illustrating an example of the hardware configuration of a communication apparatus 201 in an embodiment of the present invention.

FIG. 3 is a block diagram illustrating an example of the hardware configuration of the communication apparatus 201. The communication apparatus 201 has a controller 301, an input unit 302, an output unit 303, a communication controller 304 and a storage unit 305.

The controller 301 includes a computer CPU, ROM and RAM as well as peripherals and controls the overall communication apparatus 201. The RAM incorporated within the controller 301 is used as the memory 209. The input unit 302 includes an interface for connecting to a keyboard and mouse, etc., and controls commands and inputs to the communication apparatus 201. The output unit 303 includes an interface for connecting to a display, etc., and controls outputs such as the status of the communication apparatus 201 and results of processing.

The communication controller 304 includes an interface for communicating with the network 210 and controls communication with other communication units such as the service requester 202 and service provider 203. The message transmission unit 206 and message receiving unit 207 in FIG. 2 send and receive messages via the communication controller 304. The storage unit 305 includes an interface for controlling access to a large-capacity storage device and stores data, etc. The storage unit 305 is used as the temporary storage unit 208. A system bus 310 connects the above-mentioned components.

Figure 4:
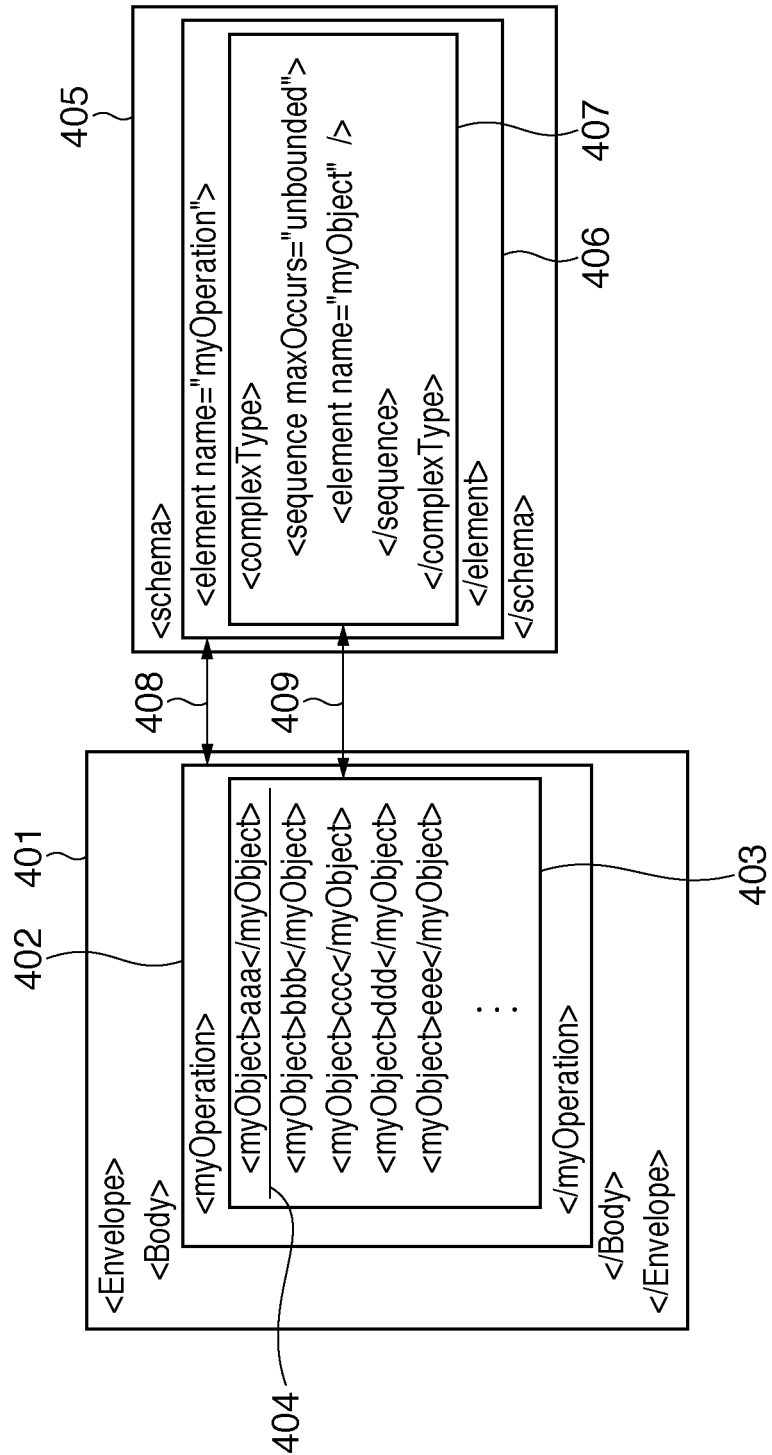
FIG. 4 illustrates an example of a message 401 and an example of a schema definition 405 thereof in an embodiment of the present invention.

FIG. 4 illustrates an example of a message 401 and a schema definition 405 thereof. The message 401 is one transmitted by the service requester 202 and is expressed in the XML format. In this embodiment, the message is a SOAP message to which an envelope tag has been attached. Included within the message is a message body 402, which is a body element. The message body 402 is the content of a message exchanged between applications. In this embodiment, the message body 402 contains array data 403. The array data 403 includes XML elements 404 as elements in an array.

In this embodiment, an array is represented by the fact that "myObject" elements, which are the XML elements 404, are continuous. Since the number of elements in an array differs for every message 401, the number is not particularly limited.

The schema definition 405 describes a schema, which is a definition of structure that can be taken on by the XML document that constitutes the message 401. Although the schema is expressed in an XML Schema format in this embodiment, the present invention is applicable regardless of the format so long as the constitution of the message 401 can be defined.

A schema definition portion 406 defines the structure that can be taken on by the message body 402, with correspondence being as indicated by arrow 408. The element name of the message body 402 is indicated by the "name" attribute of the "element" element. Here "myOperation" is the element name. Further, a schema definition portion 407 defines the structure that can be taken on by the array data 403, with correspondence being as indicated by arrow 409. The "name" attribute of the "element" element defines the element of the array data 403. Here "myObject" is the element name. Furthermore, since a "maxOccurs" attribute is "unbounded", it can be understood that this constitutes an array having "myObject" as an element. The number of "myObjects" is not limited.

It is assumed that the communication apparatus 201 holds the schema definition 405 of FIG. 4 when a message is received. The schema definition 405 may be stored by the storage unit 305 of the communication apparatus 201 beforehand or may be distributed from another apparatus on the network 210. Further, the format in which it is stored is not limited to that of the document illustrated in the example and it is capable of being held as equivalent information in another format such as application code.

Figure 5:
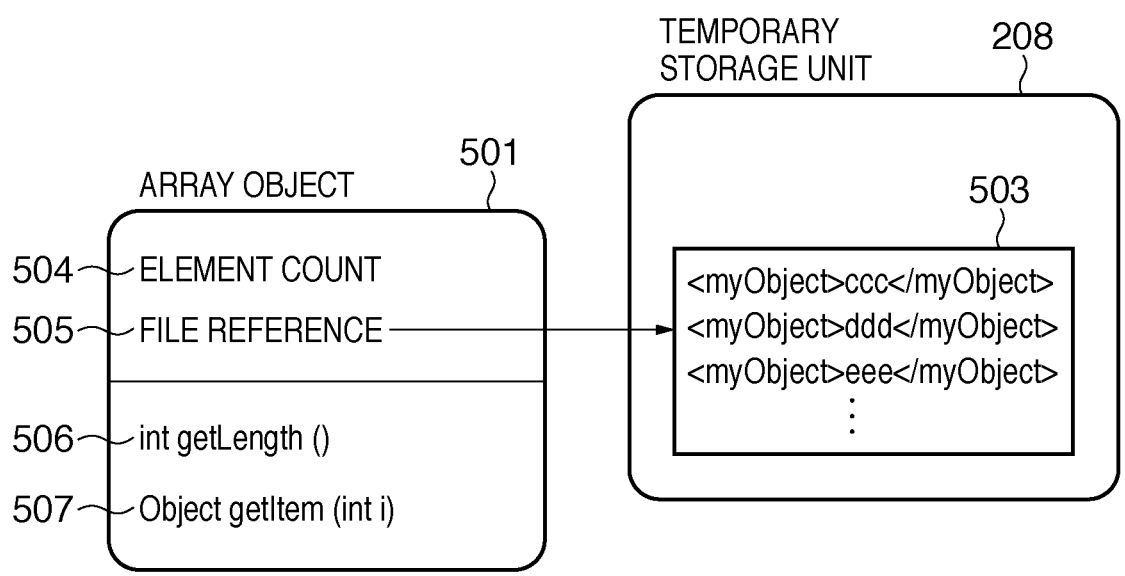
FIG. 5 is a schematic view illustrating an example of an array object in an embodiment of the present invention.

In this embodiment, the application 204 defines an array object 501, which is an object for acquiring an object that is an element in an array. FIG. 5 is a schematic view representing an example of an array object. The structure depicted in FIG. 5 is one example and imposes no particular limitation. In general, an object has an attribute, which is data such as a numerical value or character string possessed by the object, and an operation, which is a function possessed by the object.

The attribute of the array object 501 includes an element count (the number of elements) 504 and a file reference 505. The element count 504 is the number of elements of the array represented by the array object 501. The file reference 505 refers to a temporary storage file 503 that has been stored in the temporary storage unit 208, which stores the XML elements constituting the array.

Manipulation of the array object 501 includes getLength 506 and getItem 507. Here getLength 506 is a function for acquiring the element count 504, and getItem 507 is a function in which the number of an element in the array is the argument and is for acquiring an object that is an array element. In a case where an object already converted by the object conversion unit 205 has been designated, this object is returned to the application 204. On the other hand, an object not yet converted has been stored in the temporary storage file 503 as an XML element. Accordingly, in a case where an as yet unconverted object has been designated, the object conversion unit 205 converts the XML element to an object and then returns the object to the application 204.

Thus, even if a necessary element in an array is in the form of an XML element, the application 204 is capable of acquiring the element in an array in the form of an object merely by manipulating the array object 501.

Figure 6:
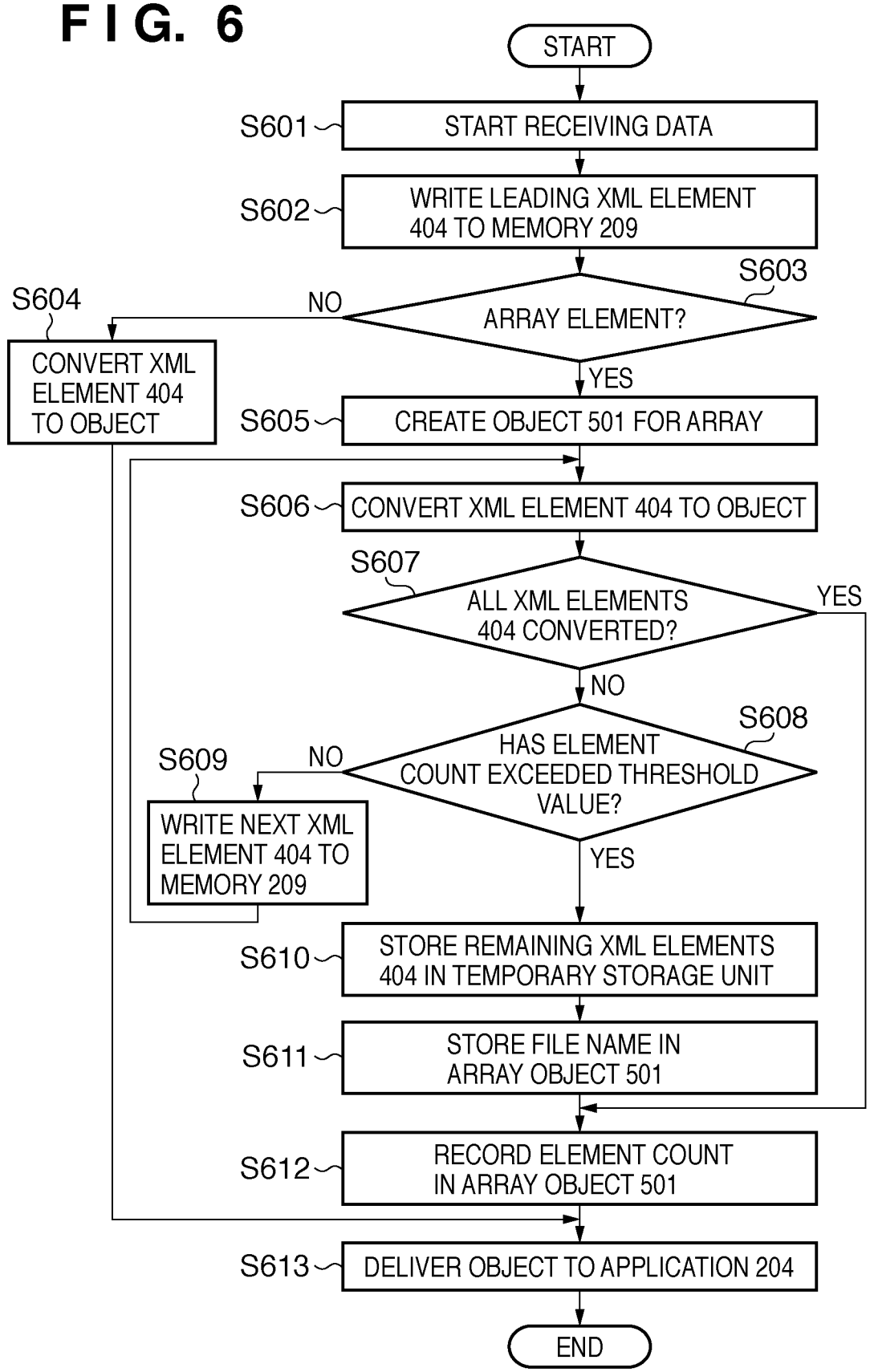
FIG. 6 is a flowchart illustrating internal operation in a case where a communication apparatus 201 receives a message in a first embodiment of the present invention.

Reference will now be made to FIG. 6 to describe control in a case where the communication apparatus 201 in the message communication system of this embodiment receives array data as a message from the service requester 202. FIG. 6 is a flowchart illustrating internal operation in a case where the communication apparatus 201 receives a message. It should be noted that the internal operation shown in FIG. 6 is one example and imposes no particular limitation. The flowchart is processed by having the controller 301 execute a computer program stored in the storage unit 305.

First, in step S601, the message receiving unit 207 of the communication apparatus 201 starts receiving a message and delivers the message to the object conversion unit 205 sequentially.

In step S602, the object conversion unit 205 writes the leading XML element 404, which is included in the message body 402 of the received message, to the memory 209.

In step S603, the object conversion unit 205 refers to the schema definition 405 and determines whether the XML element 404 that has been written to the memory 209 is an element in an array. If it is not an element in an array ("NO" at step S603), then control proceeds to step S604. In step S604, the object conversion unit 205 converts the XML element 404 to an object. Control then transitions to step S613.

If the element is an element in an array ("YES" in step S603), then control proceeds to step S605. In step S605, the object conversion unit 205 creates the array object 501 in the memory 209.

In step S606, the object conversion unit 205 converts the XML element 404, which has been written to the memory 209, to an object and writes the element to the memory 209 after the conversion thereof.

In step S607, the object conversion unit 205 determines whether all of the XML elements 404 contained in the message body 402 have been converted to objects. If all have been converted ("YES" in step S607), then control proceeds to step S612. In step S612, the object conversion unit 205 records the array element count 504 in the array object 501. In this case, storage in the temporary storage file 503 does not take place and therefore reference to the temporary storage file 503 is not recorded in the array object 501.

In the case of an as yet unconverted XML element 404 ("NO" at step S607), control proceeds to step S608. In step S608, the object conversion unit 205 determines whether the number of XML elements converted thus far has exceeded a previously set threshold value. If the threshold value has not been exceeded ("NO" in step S608), control proceeds to step S609. In step S609, the object conversion unit 205 writes the next XML element 404 to the memory 209. Control then returns to step S606.

If the threshold value has been exceeded ("YES" in step S608), then, in step S610, the temporary storage unit 208 stores the remaining XML elements 404 as is in the temporary storage file 503. It should be noted that the temporary storage unit 208 may store in the temporary storage file 503 in step S610 not only elements not converted to objects but also elements that have been converted to objects.

In step S611, the object conversion unit 205 records the file reference 505 of temporary storage file 503 as an attribute of the array object 501 in a memory 209.

In step S612, the object conversion unit 205 records the array element count 504 as an attribute of the array object 501 in memory 209.

In step S613, the object conversion unit 205 delivers the object to the application 204. If the message body 402 is not an array ("NO" in step S603), the object conversion unit 205 delivers the object converted in step S604. If the message body 402 is an array ("YES" in step S603), the object conversion unit 205 delivers the array object 501 created in step S605.

Thus, the object conversion unit 205 converts the XML elements 404 contained in the received message to objects and writes these to the memory 209. If the number of elements converted to objects exceeds a previously set threshold value, the elements remaining in the received message are stored in the temporary storage unit 208 as is. Further, the object conversion unit 205 records the array element count 504 and the file reference 505 to the temporary storage file 503 as attributes of the array object 501 in memory 209.

By virtue of the foregoing, the object conversion unit 205 is capable of delivering to the application 204 an object in a format capable of being processed by the application 204.

Figure 7:
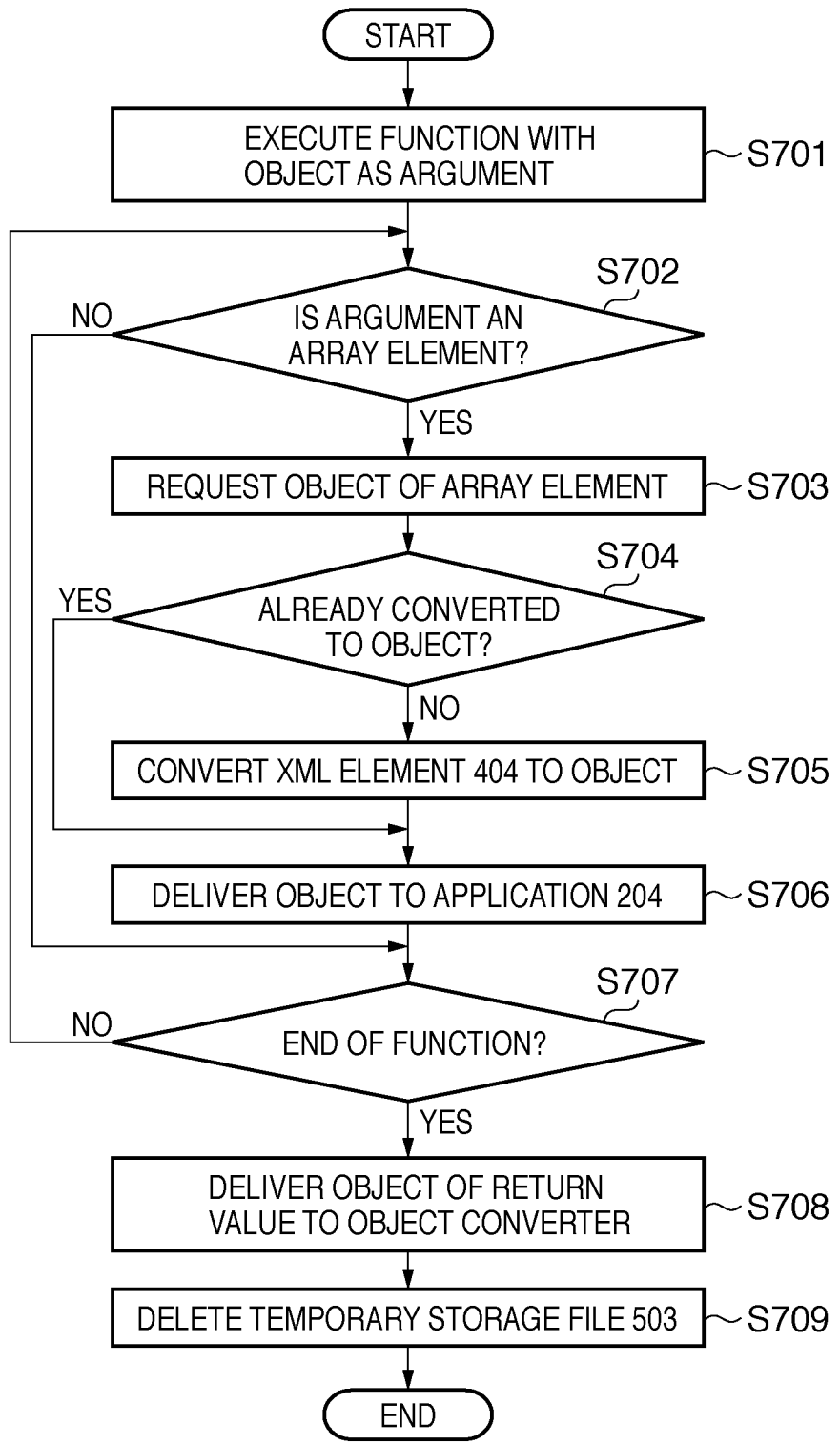
FIG. 7 is a flowchart illustrating an example of operation of a communication apparatus 201 at execution of a function by an application 204 in the first embodiment.

Next, reference will be made to FIG. 7 to describe operation when the application 204 executes a function. FIG. 7 is a flowchart illustrating an example of operation of the communication apparatus 201 at execution of a function by the application 204. The flowchart is processed by having the controller 301 execute a computer program stored in the storage unit 305. Here the description focuses on processing of the array object 501; operations specific to the application 204 that have no effect upon the essence of the present invention will not be described.

In step S701, the application 204 starts execution of a function having an object as the argument.

In step S702, the application 204 determines whether an object that has become necessary by execution of the function is an array element. If it is not an array element ("NO" in step S702), then this means that the element has already been converted to an object in step S604. Accordingly, execution of the function is continued using this object and control proceeds to step S707.

If it is an array element ("YES" in step S702), control proceeds to step S703. If the argument called by the function is the array object 501, then, using getItem 507, the application 104 reads in, one at a time, the elements that have been converted to objects. First, in step S703, the application 204 requests the object conversion unit 205 for the object of the array element using getItem 507 of the array object 501.

In step S704, the object conversion unit 205 determines whether the requested array element has already been converted to an object.

If the requested element in memory 209 has already been converted to an object ("YES" in step S704), the control proceeds to step S706, this object is read out of the memory 209 and is delivered to the application 204. It should be noted that this element is the element converted to the object at step S609 of FIG. 6.

If the element has not yet been converted ("NO" in step S704), control proceeds to step S705.

In step S705, the temporary storage unit 208 writes the corresponding XML element 404 from the temporary storage file 503 to memory 209 and the object conversion unit 205 converts the element to an object and writes the converted element to memory 209. Further, the temporary storage unit 208 deletes this XML element 404 from the temporary storage file 503. In step S706, the object conversion unit 205 returns the converted object to the application 204.

In step S707, the application 204 determines whether the function has ended. If it has not ended ("NO" at step S707), control returns to step S702 and execution of the function is continued.

If the function has ended ("YES" in step S707), then the object of the return value of the function is returned to the object conversion unit 205 in step S708.

In step S709, the temporary storage unit 208 deletes the temporary storage file 503 if the file exists. The object conversion unit 205 then converts the object of the return value to the XML element 404 and transmits it to the service requester 202 together with the message.

In accordance with this embodiment, as described above, the application 204 is not made to process the message directly and it is possible to receive a message that does not put the memory 209 under pressure.

It is determined in step S608 in FIG. 6 whether the number of array elements has exceeded the threshold value. At this time the determination may be made with the criterion being the amount of memory used by the XML elements 404 or the amount of unused memory. This will make it possible to judge the amount of memory used by the object conversion unit 205 in conformity with the status of the memory 209 being used by other applications.

Further, a transition may be made to step S610 after it is determined in step S603 of FIG. 6 whether the XML element 404 is an array element. This will make it possible to shorten the time needed for object conversion prior to execution of the function by the application 204. In this case also the advantage of not having the application 204 process a message directly is not sacrificed.

<Second Embodiment>

In the first embodiment, a case where the communication apparatus 201 has received a message containing array data has been described. In a second embodiment, a case where the communication apparatus 201 transmits a message containing array data will be described.

Figure 8A:
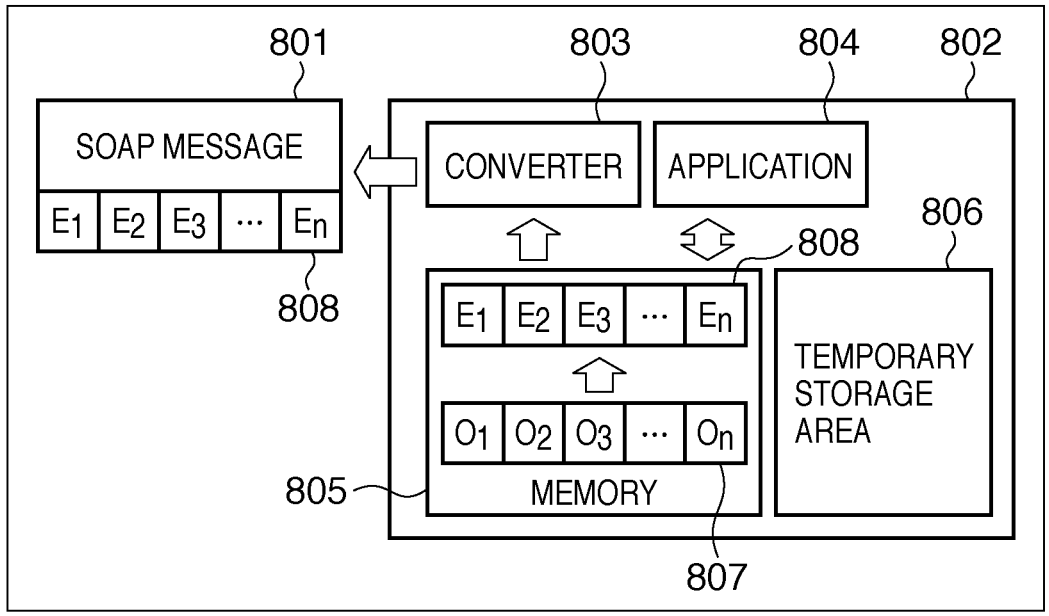
FIGS. 8A and 8B are diagrams comparing methods of processing SOAP messages to be transmitted.
Figure 8B:
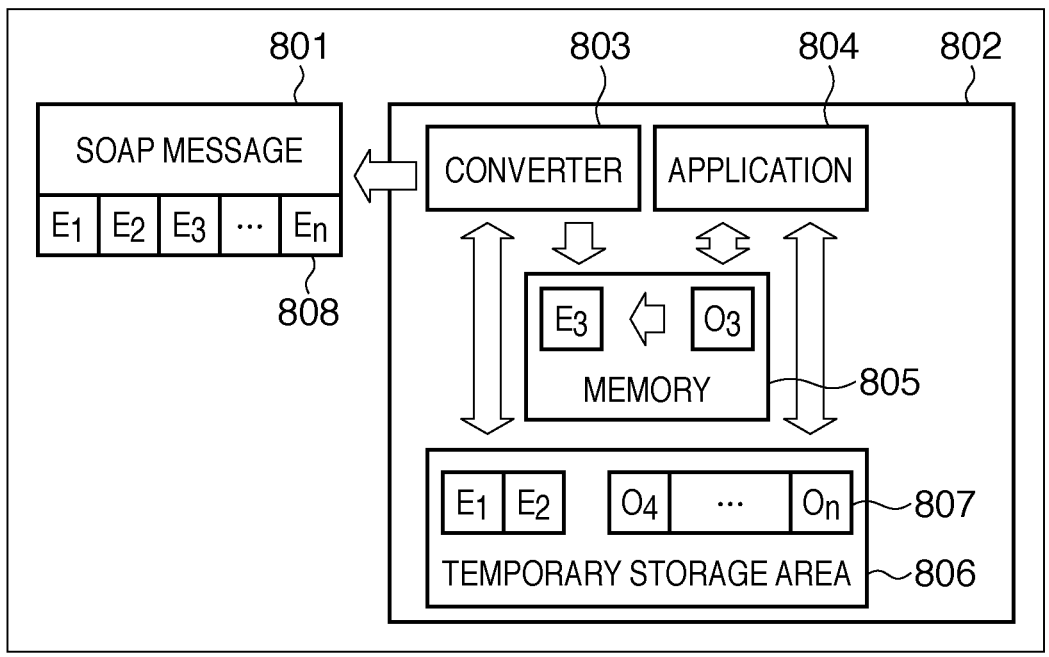

An overview of this embodiment will be described with reference to FIGS. 8A and 8B. FIGS. 8A and 8B are diagrams comparing methods of processing SOAP messages to be transmitted.

As illustrated in FIG. 8A, if, after all objects 807, which are elements in an array, are written to a memory 805, a converter 803 of a communication apparatus 802 converts these to XML elements 808, then there is a possibility that that the memory 805 will be put under pressure. Accordingly, as shown in FIG. 8B, the converter 803 converts objects that an application 804 has expanded in the memory 805 to XML elements 808 one at a time or collectively in a number that will not put the memory under pressure and stores the elements in a temporary storage area 806. Objects 807 that have been converted are deleted from the memory 805. The application 804 writes object from the temporary storage area 806 to the memory 805. Further, if conversion of all objects to XML elements has been completed, the converter 803 transmits a SOAP message 801 containing the XML elements.

The system configuration and hardware configuration in this embodiment are similar to those of the first embodiment and need not be described again.

Figure 9:
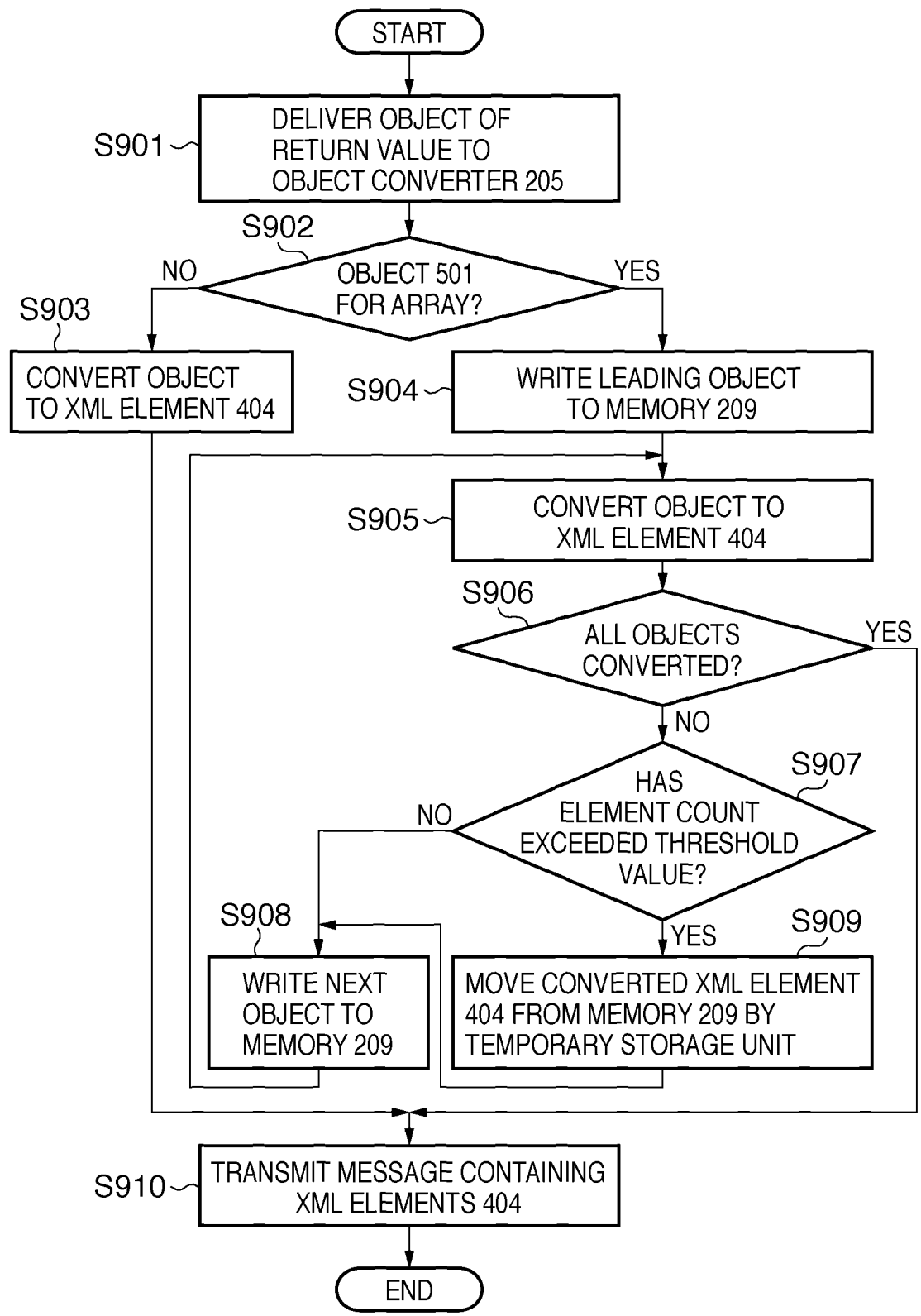
FIG. 9 is a flowchart illustrating internal operation in a case where a communication apparatus 201 transmits a message in a second embodiment of the present invention.

FIG. 9 is a flowchart illustrating internal operation in a case where the communication apparatus 201 transmits a message. The flowchart is processed by having the controller 301 execute a computer program stored in the storage unit 305.

In step S901, the application 204 delivers to the object conversion unit 205 an object to be transmitted.

In step S902, the object conversion unit 205 determines whether the accepted object is the array object 501 (shown in FIG. 5). If the object is not the array object 501 ("NO" in step S902), control proceeds to step S903. In step S903, the object conversion unit 205 converts the object to the XML element 404. Control then transitions to step S910.

If the object is the array object 501 ("YES" in step S902), control proceeds to step S904.

In step S904, the temporary storage unit 208 writes the leading object of the array to the memory 209. If this object is already in the memory 209, this operation is unnecessary.

In step S905, the object conversion unit 205 converts this object of the array element to the XML element 404.

In step S906, the object conversion unit 205 determines whether all objects included in the array have been converted.

If there is an as yet unconverted object ("NO" in step S906), control proceeds to step S907.

In step S907, it is determined whether XML elements 404 that have been converted and are still in memory 209 have exceeded a previously set threshold value. If the threshold value has not been exceeded ("NO" in step S907), then the temporary storage unit 208 writes the next object to memory 209 in step S908. If this object is already in the memory 209, this operation is unnecessary. Control then returns to step S905.

If the threshold value has been exceeded ("YES" in step S907), control proceeds to step S909. In step S909, the temporary storage unit 208 stores the converted XML element 404 in the temporary storage file 503 and deletes the stored XML element 404 from the memory 209. Control then proceeds to step S908.

If all objects for which transmission has been requested by the application 204 have been converted ("YES" in step S905), control proceeds to step S910.

In step S910, the object conversion unit 205 creates a SOAP message containing the XML elements 404 and delivers the SOAP message to the message transmission unit 206. If XML elements have been stored in the temporary storage file 503, then these XML elements are written from the file to the memory 209 sequentially to create a SOAP message. If the delivery of all XML elements to the message transmission unit 206 has finished, then the array object 501 and temporary storage file 503 are deleted if they exist.

Thus, in accordance with this embodiment, the application 104 is not made to process the message directly and it is possible to transmit a message that does not put the memory 209 under pressure.

<Other Embodiments>

Note that the present invention can be applied to an apparatus comprising a single device or to system constituted by a plurality of devices. Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention. In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R). As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer. Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A processing apparatus for processing eXtensible Markup Language (XML) elements contained in a Simple Object Access Protocol (SOAP) message received via a network, by an application, the processing apparatus comprising:
   a selection unit configured to, when a determination is made based on a schema definition of a received SOAP message that the received SOAP message includes a plurality of XML elements, select, in accordance with a number of the XML elements, whether at least one of the XML elements is to be converted to a form that can be processed by an application in response to a request from the application, or whether all of the XML elements are to be converted to the form that can be processed by the application prior to receiving the request from the application;
   a storage unit configured to store the at least one of the XML elements;
   a read-out unit configured to read one of the at least one XML elements that has been requested by the application, from the storage unit; and
   a conversion unit configured to convert the one of the at least one of the XML elements read out from the storage unit to the form that can be processed by the application in response to the request from the application, or to convert all of the XML elements contained in the received SOAP message to the form that can be processed by the application prior to the request from the application, in accordance with a selection made by the selection unit.

2. The apparatus according to claim 1, wherein, in accordance with the selection made by the selection unit, the conversion unit converts the one of the at least one element read out from the storage unit, to an object that can be processed by the application in response to the request from the application, and to convert all of the XML elements contained in the received SOAP message to objects that can be processed by the application prior to the request from the application.

3. The apparatus according to claim 2, wherein the conversion unit generates an object for reading the at least one of the plurality of XML elements from the storage unit by the application, and the read-out unit reads the at least one of the plurality of XML elements requested by the application from the storage unit based upon the object for reading out the XML element.

4. A method of processing eXtensible Markup Language (XML) elements contained in a Simple Object Access Protocol (SOAP) message received via a network, by an application, the method comprising:
   when a determination is made based on a schema definition of a received SOAP message that the received SOAP message includes a plurality of XML elements, selecting, in accordance with a number of the XML elements, whether at least one of the XML elements is to be converted to a form that can be processed by an application in response to a request from the application, or all of the XML elements are to be converted to the form that can be processed by the application prior to the request from the application;
   storing the at least one of the XML elements in a memory;
   reading one of the at least one of the XML elements that has been requested by the application, out of the memory; and
   in accordance with a selection made by the selecting, converting the one of the at least one of the XML elements read out of the memory to the form that can be processed by the application in response to the request from the application, or converting all of the XML elements contained in the received SOAP message to the form that can be processed by the application prior to the request from the application.

5. The method according to claim 4, wherein, in accordance with the selection made, the one of the at least one of the XML elements read out of the memory is converted to an object that can be processed by the application in response to the request from the application, and all of the XML elements contained in the received SOAP message are converted to objects that can be processed by the application prior to the request from the application.

6. The method according to claim 5, further comprising generating an object for reading the at least one of the XML elements out of the memory by the application, wherein the at least one of the XML elements requested by the application is read out of the memory based upon the object for reading out the XML element.

7. A non-transitory computer-readable storage medium storing a computer program that, when executed by a computer, causes the computer to perform a method for processing eXtensible Markup Language (XML) elements contained in Simple Object Access Protocol (SOAP) a message received via a network, by an application, the method comprising:
   when a determination is made based on a schema definition of a received SOAP message that the received SOAP message includes a plurality of XML elements, selecting, in accordance with a number of the XML elements, whether at least one of the XML elements is to be converted to a form that can be processed by an application in response to a request from the application, or all of the XML elements are to be converted to the form that can be processed by the application prior to the request from the application;

storing the at least one of the XML elements in a memory;

reading one of the at least one of the XML elements that has been requested by the application, out of the memory; and in accordance with a selection made by the selecting, converting the one of the at least one of the XML elements read out of the memory to the form in response to the request from the application, or converting all of the XML elements contained in the received SOAP message to the form that can be processed by the application prior to the request from the application.

8. The non-transitory computer-readable storage medium according to claim 7, wherein, in accordance with the selection made by the selecting, the one of the at least one of the XML elements read out of the memory is converted to an object that can be processed by the application in response to the request from the application, and all of the XML elements contained in the received SOAP message are converted to objects that can be processed by the application prior to the request from the application.

9. The non-transitory computer-readable storage medium according to claim 8, wherein the method further comprises generating an object for reading the one of the at least one of the XML elements out of the memory by the application, wherein the one of the at least one of the XML elements requested by the application is read out of the memory based upon the object for reading out the XML element.

* * * * *